(12) United States Patent
Anzai et al.

(10) Patent No.: US 7,827,269 B2
(45) Date of Patent: Nov. 2, 2010

(54) SYSTEM AND METHOD FOR MANAGING NETWORKED STORAGE DEVICES WITH A PLURALITY OF LOGICAL UNITS

(75) Inventors: Tomoya Anzai, Sagamihara (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 314 days.

(21) Appl. No.: 12/007,639

(22) Filed: Jan. 14, 2008

(65) Prior Publication Data

US 2008/0244055 A1 Oct. 2, 2008

(30) Foreign Application Priority Data

Mar. 30, 2007 (JP) ............... 2007-090117

(51) Int. Cl.
*G06F 15/173* (2006.01)
(52) U.S. Cl. .................. 709/223; 709/213; 711/111
(58) Field of Classification Search .......... 709/213, 709/223; 711/111
See application file for complete search history.

(56) References Cited

U.S. PATENT DOCUMENTS

| | | | |
|---|---|---|---|
| 6,754,718 B1 * | 6/2004 | Dobberpuhl et al. ........ 709/250 |
| 7,039,662 B2 * | 5/2006 | Kano et al. ................. 707/204 |
| 7,080,190 B2 * | 7/2006 | Weber ........................ 710/315 |
| 7,328,260 B1 * | 2/2008 | Muthiyan et al. ........... 709/224 |
| 7,418,570 B2 * | 8/2008 | Saito ........................... 711/202 |
| 2001/0054093 A1 * | 12/2001 | Iwatani ....................... 709/223 |
| 2003/0055943 A1 * | 3/2003 | Kanai ......................... 709/223 |
| 2004/0064459 A1 | 4/2004 | Pooni et al. |
| 2004/0133576 A1 * | 7/2004 | Ito et al. ......................... 707/9 |
| 2005/0198434 A1 * | 9/2005 | Uchiumi et al. ............. 711/113 |
| 2006/0218370 A1 * | 9/2006 | Satoyama et al. ........... 711/170 |
| 2006/0236060 A1 * | 10/2006 | Shitomi et al. .............. 711/170 |

* cited by examiner

*Primary Examiner*—Thu Nguyen
*Assistant Examiner*—Thomas J Dailey
(74) *Attorney, Agent, or Firm*—Hitachi America, Ltd.

(57) ABSTRACT

A computer is provided with: a device related value acquisition unit that acquires a device related value (for example a LUN), which is a value relating to a device; a calculation formula including a first variable in which the device related value is substituted; a device identification value calculation unit that calculates a device identification value of a device corresponding to the acquired device related value by substituting this device related value in the first variable; and a correspondence registration unit that registers the calculated device identification value and the acquired device related value in an electronic information resource.

11 Claims, 11 Drawing Sheets

FIG. 4A

NUMBER/FILENAME MANAGEMENT TABLE 214

| # | DEVICE NUMBER PORTION 2141 | DEVICE FILENAME 2142 |
|---|---|---|
| 0 | 3:0 | /dev/lu00000 |
| 1 | 3:257 | /dev/lu01010 |
| ⋮ | ⋮ | ⋮ |

FIG. 4B

MINOR NUMBER MANAGEMENT TABLE 213

| # | MINOR NUMBER 2131 | target ID 2132 | LUN 2133 |
|---|---|---|---|
| 0 | 0 | 0 | 0 |
| 1 | 257 | 1 | 1 |
| ⋮ | ⋮ | ⋮ | ⋮ |

FIG. 4C

PERSISTENT BINDING SETTING TABLE 217

| # | ADAPTER NUMBER 2171 | WWN 2172 | target ID 2173 |
|---|---|---|---|
| 0 | 0 | 50060e80033aa001 | 0 |
| 1 | 0 | 50060e80033aa011 | 1 |
| ⋮ | ⋮ | ⋮ | ⋮ |

FIG. 5A

PORT MANAGEMENT TABLE 410

| # | Port # (4101) | WWN (4102) |
|---|---|---|
| 0 | 00 | 50060e80033aa001 |
| 1 | 01 | 50060e80033aa002 |
| ⋮ | ⋮ | ⋮ |

FIG. 5B

LU MANAGEMENT TABLE 409

| # | LDEV # (4091) | Port # (4092) | LUN (4093) |
|---|---|---|---|
| 0 | 0 | 00 | 0 |
| 1 | 1 | 00 | 1 |
| 2 | 2 | 01 | 0 |
| ⋮ | ⋮ | ⋮ | ⋮ |

MINOR NUMBER (ALLOCATED NUMBER) = "target ID" × "MAX_LU" + LUN

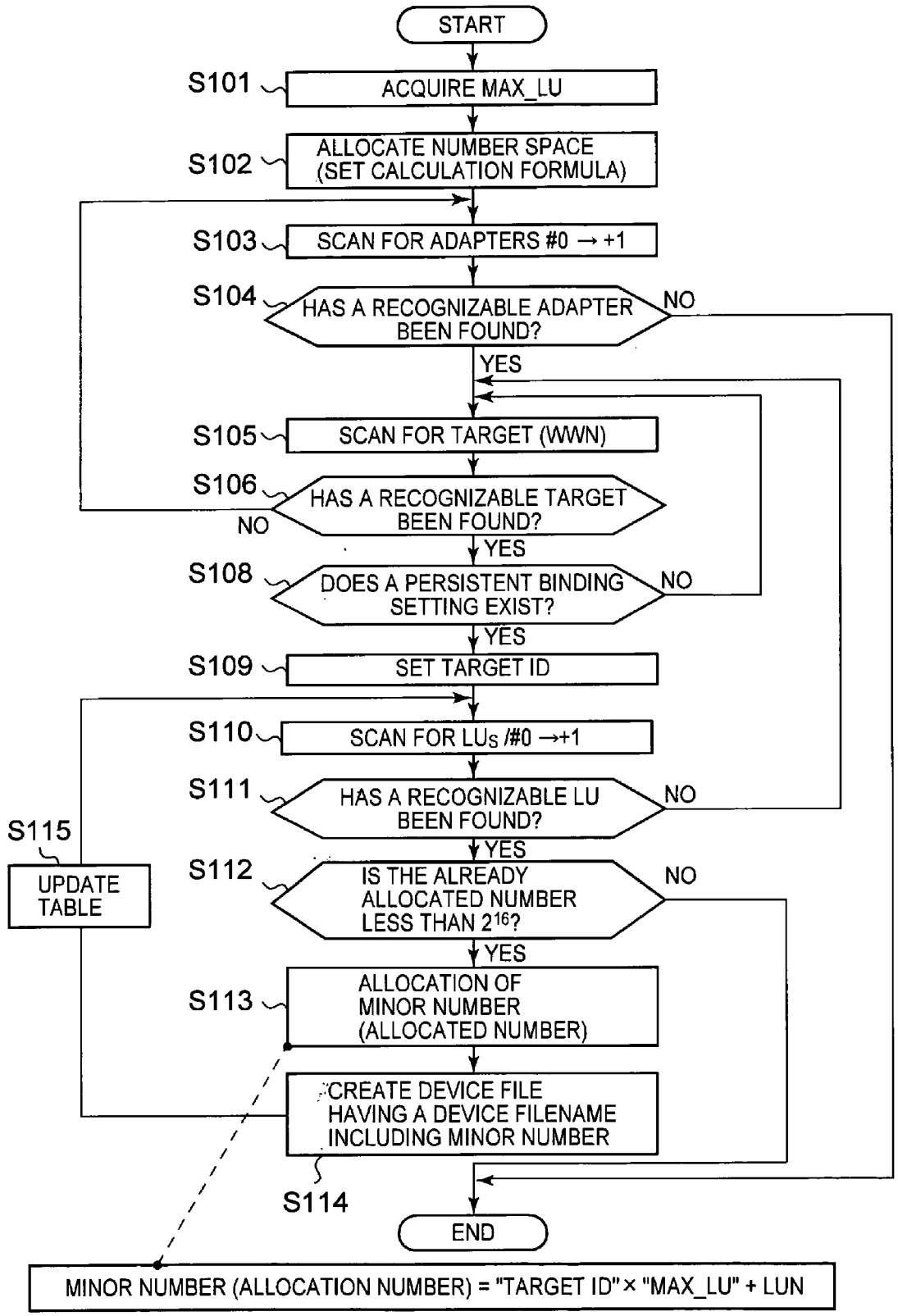

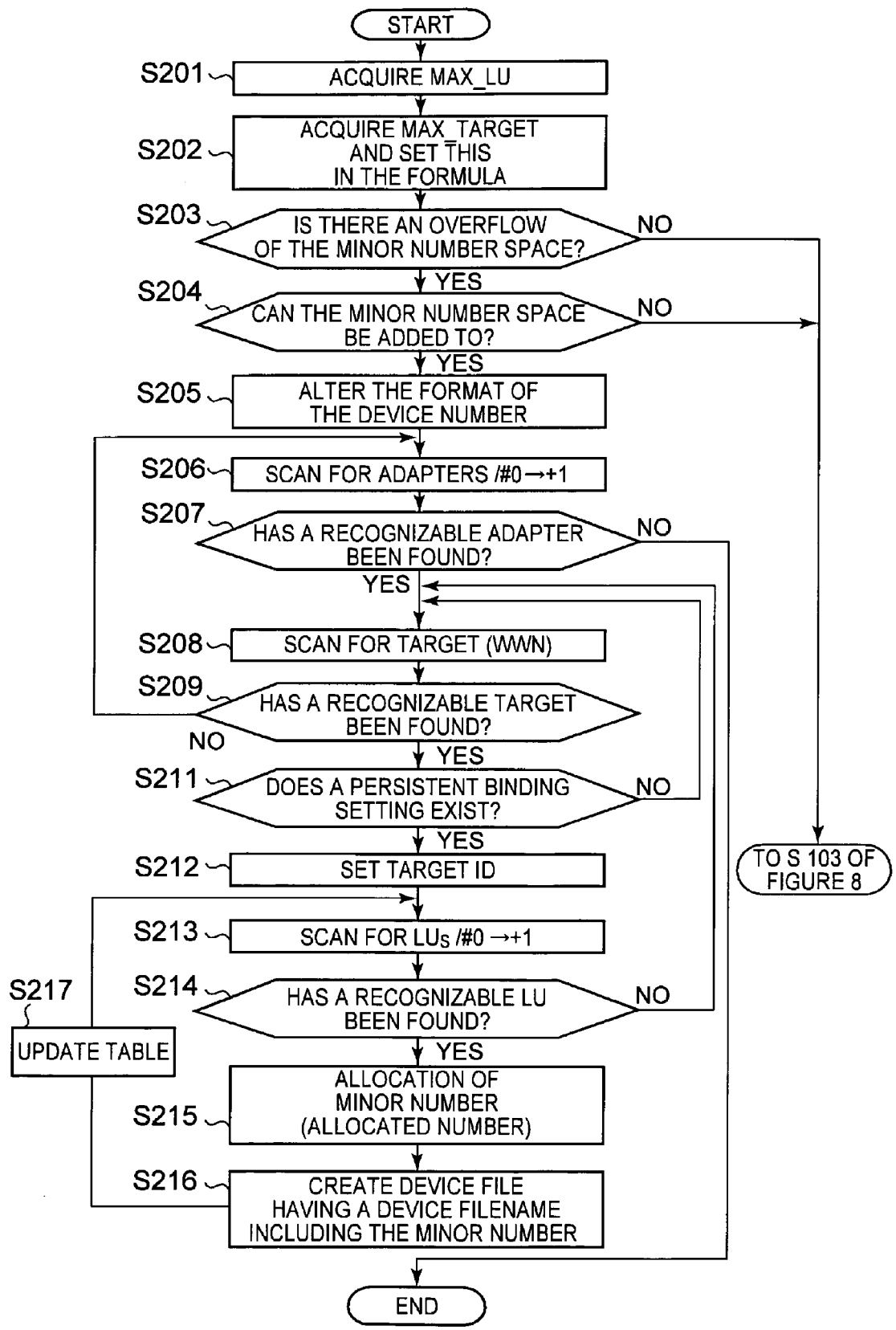

SYSTEM AND METHOD FOR MANAGING NETWORKED STORAGE DEVICES WITH A PLURALITY OF LOGICAL UNITS

CROSS-REFERENCE TO PRIOR APPLICATION

This application relates to and claims the benefit of priority from Japanese Patent Application No. 2007-90117, filed on Mar. 30, 2007, the entire disclosure of which is incorporated herein by reference.

BACKGROUND

The present invention generally relates to management of devices.

For example a computer system may comprise one or more storage systems and one or more servers connected with a SAN (Storage Area Network).

For example, a storage system may comprise one or more ports and a plurality of physical storage units. A plurality of logical units (LUs) are formed as logical storage units based on the storage space that is provided by this plurality of physical storage units. In a storage system, usually, LUNs (Logical Unit Numbers) corresponding to each LU are managed.

The OS (Operating System) loaded on a server may be for example a UNIX (registered trademark)-based OS (referred to hereinbelow for the sake of convenience as "UNIX"). In UNIX, for example a port of a storage system is recognized as a target and an LU is recognized as a device. In UNIX, a SCSI (Small Computer System Interface) driver determines a minor number and device filename in respect of a recognized device. The data space of the device number comprises the major space (most significant part) and minor space (least significant part). The minor number is a value represented by part (for example 16 bits) or all of the minor space (for example 20 bits).

In UNIX, a SCSI driver determines the minor number and device filename in respect of each device in the order of device recognition. Also, in UNIX, after successive recognition of one or more devices associated with one target, one or more devices associated with another target may be successively recognized. For these reasons, in a storage system, if for example UNIX (i.e. OS) rebooting or fail-over takes place after alteration of the number of targets and/or devices, the correspondence of the minor numbers and device filenames with devices may be altered.

Specifically, let us assume for example that, as shown in FIG. 1A, in a first storage system 0, a port (P00) constituting a target is present, LU0 and LU1 are associated with P00, and, in the server, UNIX can recognize P00 and LU0 and LU1 associated with P00. Also, let us assume that in a second storage system 1, a port (P10) constituting a target is present, LU0 and LU1 are associated with P10, and, in the server, UNIX can recognize P10 and LU0 and LU1 associated with P10. In such an environment, UNIX recognizes successively in for example the order LU0, LU1, a plurality of LUs associated with P00 and next recognizes successively in for example the order LU0, LU1 a plurality of LUs associated with P10. In this case, since the LU0 associated with P10 is the third to be recognized, its minor number is determined as "2" (minor: 2 means that the minor number is "2"), and its device filename is determined as the value "/dev/sdc", corresponding to being the third to be recognized.

Let us assume that, after this, for example as shown in FIG. 1B, in the storage system 0, LU2 is added as an LU associated with P00, and, thereafter, UNIX is rebooted. If this done, if the LUs are recognized by the same procedure as in the case of FIG. 1A, the added LU2 will be the third to be recognized, so that the LU0 associated with P10 will be the fourth to be recognized. Consequently, as shown in FIG. 1B, as the minor number of the LU0 associated with P10, "3" will be determined, indicating that this is the fourth to be recognized, and, as the device filename, the value "/dev/sdd" corresponding to being the fourth to be recognized will be determined. In other words, referring to the LU0 associated with P10, the corresponding minor number and device filename before and after the addition of LU2 will be altered from minor number "2" and device filename "/dev/sdc" to minor number "3" and device filename "/dev/sdd".

Likewise, in for example the environment shown in FIG. 1B, in the case where UNIX is rebooted after access of LU2 associated with P00 has become impossible due for example to malfunction, an environment is produced as shown in FIG. 1A, so, in this case also, the correspondence of the minor numbers and device filenames with the devices is altered.

When the correspondence of the minor numbers and device filenames with the devices is altered in this way, the problem arises that it will not necessarily be possible to access the same device (for example, a different device will be mounted in respect of the same minor number and device filename, or mounting will fail). Consequently, when for example a client transmits an access request designating a device filename corresponding to a desired device to a server, at the server, UNIX will transmit an access request specifying the LU corresponding to this device filename, but, as described above, since the correspondence has been altered, either a different LU will be accessed before and after the alteration of correspondence, or access may fail.

Methods of fixing the correspondence with the device in respect of a device filename are known (see for example Laid-open US Patent Application No. 2004/0064459). According to Laid-open US Patent Application No. 2004/0064459, a correspondence table is prepared in which there are recorded serial numbers or the like and device filenames respectively corresponding to all the devices; when the serial number or the like of a device is acquired by a SCSI inquiry command, the device filename corresponding to this serial number or the like is searched for in this correspondence table: if the device filename is then found, this filename is associated with the device.

Although the above Laid-open US Patent Application No. 2004/0064459 discloses a method of fixing the correspondence between device filenames and devices, no method at all has been disclosed of fixing the correspondence between the minor number of the device number and a device. In some cases, UNIX may receive a request designating the device number rather than the device filename. In such cases, a problem as described above may arise.

Also, in the above Laid-open US Patent Application No. 2004/0064459, a correspondence table is required that records the serial number or the like and device filename in respect of all of the devices present in a storage system. Depending on for example the scale and number of devices of a storage system, there may be a large number of devices (for example a few thousands to a few tens of thousands). In such cases, the size of the correspondence table becomes large, and the load of searching for the device filename corresponding to a serial number or the like becomes high.

Such problems occur not merely in respect of minor numbers but in any environment in which management is conducted with device identifying values different from the device filenames associated with the devices.

SUMMARY

An object of the present invention is therefore to fix the correspondence of device identifying values other than the device filenames with devices, without employing a correspondence table.

Further objects of the present invention will become clear from the following description.

A calculation formula is prepared including a first variable in which a device related value can be substituted; by substituting an acquired device related value in this first variable, a device identifying value that is unique to the device corresponding to this device related value is calculated, and the device identifying value that has thus been calculated and the device related value acquired as described above are registered.

BRIEF DESCRIPTION OF THE DRAWINGS

FIG. 4A shows an example of the structure of a number/filename management table 214;

FIG. 4B shows an example of the structure of a minor number management table 213;

FIG. 4C shows an example of the structure of a persistent binding setting table 217;

FIG. 5A shows an example of the structure of a port management table 410;

FIG. 5B shows an example of the structure of an LU management table 409;

FIG. 8 shows an example of the flow of processing for determining the minor number and device filename;

FIG. 11 shows an example of the flow of processing for determining the minor number and device filename in the case of the second embodiment.

DESCRIPTION OF THE PREFERRED EMBODIMENTS

Figure 1A:
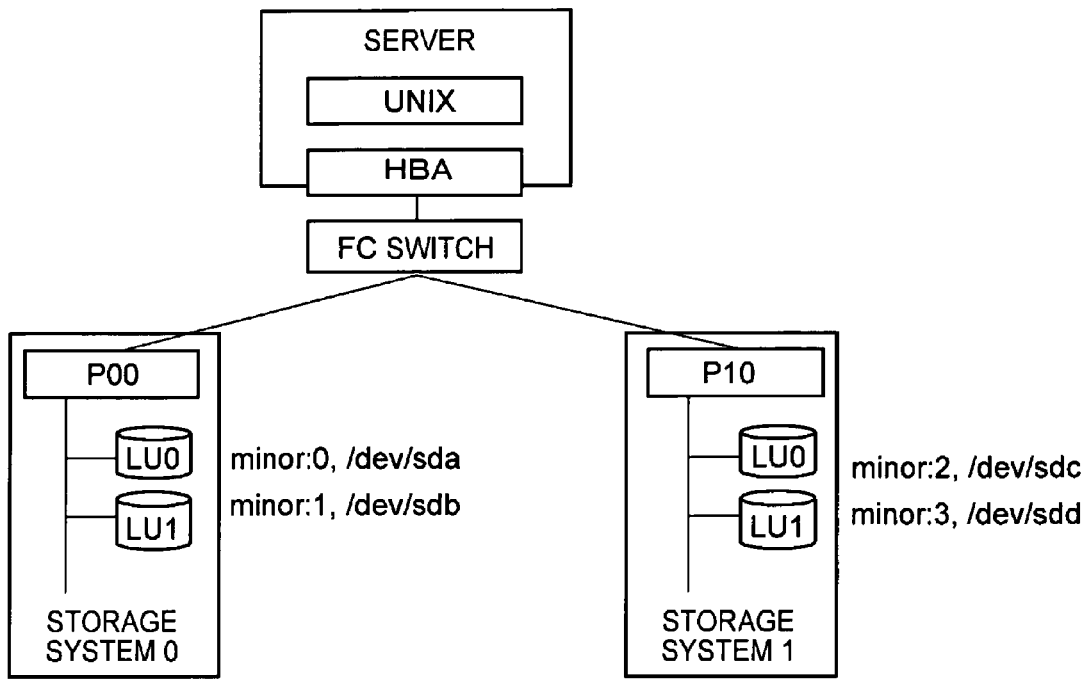
FIG. 1A shows an example of correspondence of LU with minor number and device filename when the minor number and device filename are determined by a conventional method.

In one embodiment, the computer may comprise: a device related value acquisition unit that acquires a device related value, which is a value relating to a device; a calculation formula including a first variable in which the device related value may be substituted; a device identification calculation unit that calculates a device identification value of the device corresponding to the device related value that has thus been acquired by substituting this device related value in the first variable; and a correspondence registration unit that registers the calculated device identification value and the device related value that has thus been acquired in an electronic information resource.

In one embodiment, the computer may further comprise a target related value acquisition unit that acquires a target related value that is a value related to the target. The computer may further include a second variable in which this target related value may be substituted. The device identification value calculation unit may calculate the device identification value by substituting the acquired target related value in the second variable.

In one embodiment, the computer further comprises a device maximum device number acquisition unit that acquires a maximum device number, which is a value prepared beforehand and expressing the maximum number of devices in respect of a single target. The calculation formula further includes a third variable in which the maximum device number may be substituted. The device identification value calculation unit can calculate the device identification value by substitution of the acquired maximum device number in the third variable.

In one embodiment, the calculation formula is:—

Device identification number=second variable×third variable+first variable.

In one embodiment, the target related value is the target ID, which is the identifier of the target. The target ID is an ID that is associated beforehand with the WWN (World Wide name) of the target by persistent binding setting.

In one embodiment, the computer further comprises a filename creation unit that creates a device file having a device filename including the calculated device identification value.

In one embodiment, the product of the maximum target number, which is a value prepared beforehand and expressing the maximum number of targets, and a maximum device number is no more than the maximum number of the device identification value.

In one embodiment, the computer may comprise a maximum target number acquisition unit and a decision unit. The maximum target number acquisition unit may acquire the maximum target number, which is a value prepared beforehand and expressing the maximum number of targets. The decision unit may make a decision as to whether or not the number of the calculated device identification value is smaller than the product of the maximum target number that has been acquired and the maximum device number that has been acquired. The device related value acquisition unit is constituted so as to acquire a device related value in respect of another single device, if a device identification value has been calculated in respect of one device. The device identification value calculation unit may terminate without calculating a device identification value in respect of a device related value of an acquired single device, if the result of the decision is negative.

In one embodiment, the computer may comprise a decision unit and a format alteration unit. The decision unit may make a decision as to whether or not the product of the maximum target number, which is a value prepared beforehand and expressing the maximum number of targets, and the maximum device number is greater than the maximum number of the device identification value. If the result of this decision is positive, the format alteration unit can increase the size of a space for representing the device identification number, without altering the size of a space of device identification information, in the device identification information that includes the device identification value.

In one embodiment, the computer may comprise a decision unit and a format alteration unit. This decision unit may decide whether or not shiftable space constituting space capable of being shifted to the space for representing the device identification value, in this device identification information, is present in the device identification information that includes the device identification value. If the result of this decision is positive, the format alteration unit may shift the shiftable space in the device identification information to the space for representing the device identification value.

In one embodiment, if, in the device identification information space, one or more prescribed non-significant consecutive values occupy a given space outside the space of the device identification value, this given space constitutes the shiftable space.

In one embodiment, the computer may further comprise a target ID acquisition unit and a maximum LU number acquisition unit. The target ID acquisition unit can acquire a target ID associated beforehand by persistent binding setting with the WWN (World Wide Name) of the target of a port of the storage system. The maximum LU number acquisition unit can acquire the maximum LU number, which is a value prepared beforehand and expressing the maximum number of logical units (LUs) in respect of a single port of the storage system. The device related value acquisition unit can acquire an LUN (logical unit number). The device identification value is a specified number represented in space (for example space of a prescribed number of most significant consecutive bits) at a prescribed position of the minor space in the device number expressed by the space constituted by the major space and minor space managed by the UNIX-based OS. The specified number is for example the number of the portion excluding the specified portion (for example the portion called the partition number) of the number (in general, this number is called the "minor number") represented by the minor space as a whole. More specifically, the specified number is the number called, for convenience in for example the first and second embodiment, to be described, the "minor number". The calculation formula is:

specified number=second variable×third variable+first variable.

The first variable is the variable in which the acquired LUN is substituted. The second variable is the variable in which the acquired maximum LU number is substituted. The third variable is the variable in which the acquired target ID is substituted.

In one embodiment, the computer may further comprise a decision unit that decides whether or not the number of the calculated specified number is smaller than the product of the maximum number of acquired targets and the maximum number of acquired LUs. When the above specified number in respect of one LU constituting a single device is calculated, the device related value acquisition unit can acquire a LUN in respect of another single LU. If the result of the above decision is negative, the device identification value calculation unit may terminate without calculating the above specified number in respect of the acquired single LUN.

In one embodiment, in specified processing of the OS (for example, during rebooting of the OS or during re-reading of the settings of the OS) after termination of the persistent binding setting, the device related value acquisition unit, the device identification value calculation unit, and the correspondence registration unit respectively execute prescribed processing (i.e. processing as described above), and, after the device identification value calculation unit has terminated, the specified processing of the OS (for example rebooting of the OS or re-reading of the OS settings) is completed. The OS comprises a SCSI driver and the SCSI driver may comprise a device related value acquisition unit, device identification value calculation unit and correspondence registration unit.

In one embodiment, the computer may further comprise a first decision unit and a format alteration unit. If the product of the maximum target number, which is a value prepared beforehand and expressing the maximum number of targets, and the maximum LU number is larger than $2^n$ (where n is the bit number constituting the size of the space expressing the specified number, and is a natural number), which is the maximum number of the specified number, the first decision unit can perform a first decision as to whether or not k (where k is a natural number) bits shiftable to the specified number space, which is a space for expressing the specified number are present in the major space. If the result of the first decision is positive, the format alteration unit may expand the size of the specified number space from n bits to n+k bits without altering the space size of the device number, by shifting the k shiftable bits in the major space to the specified number space.

In one embodiment, the computer may further comprise a second decision unit. If the result of the first decision is negative, the second decision unit may perform a second decision as to whether or not the number of the calculated specified number is smaller than the product of the acquired maximum target number and acquired maximum LU number. When the specified number in respect of one LU constituting a single device is calculated, the device related value acquisition unit is constructed so as to acquire a LUN in respect of another single LU. If the result of the second decision is negative, the device identification value calculation unit may terminate without calculating the specified number in respect of the acquired single LUN.

Any two or more of the plurality of embodiments described above may be combined. Also, the various units described above (such as for example the device related value acquisition unit, device identification value calculation unit and correspondence registration unit) may be constructed by hardware, a computer program or a combination of these (for example, a part being executed by a computer program and the remaining part being executed by hardware). The computer program is executed by being read into a prescribed processor. Also, when the information processing that is performed by reading the computer program to the processor is executed, suitably, a storage region present on a hardware resource such as a memory may be employed. Also, the computer program may be installed on the computer from a recording medium such as a CD-ROM, or may be downloaded to the computer through a communication network.

Also, a device number setting unit, to be described, may be constituted by at least one of: a device related value acquisition unit, a device identification value calculation unit, a correspondence registration unit, target related value acquisition unit, maximum device number acquisition unit, filename creation unit, maximum target number acquisition unit, decision unit, first decision unit, second decision unit, format alteration unit, maximum LU number acquisition unit and target ID acquisition unit described above.

Various embodiments are described in detail below with reference to the drawings.

First Embodiment

Figure 2:
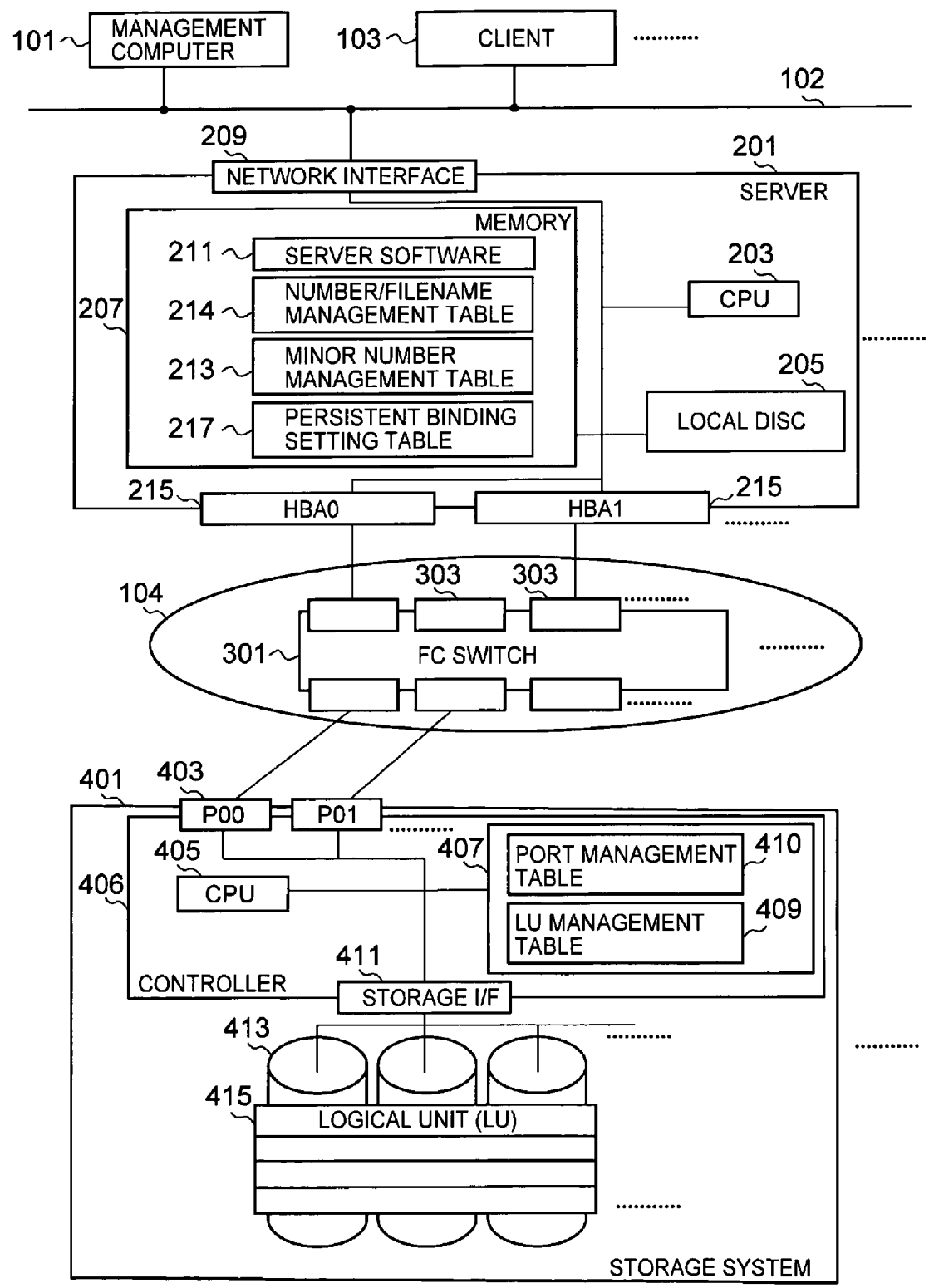
FIG. 2 shows an example of the structure of a computer system according to the first embodiment of the present invention.

FIG. 2 shows an example of the construction of a computer system according to the first embodiment of the present invention.

One or more client computers 103, a management computer 101, and one or more servers 201 are connected with a LAN (local area network) 102. One or more servers 201 and one or more storage systems 401 are connected with a SAN (or for example an IP-SAN or the like) 104. The LAN 102 and SAN 104 are usually communication networks of respectively different types, but they could be communication networks of the same type. Also, instead of being separated as between the LAN 102 and SAN 104, the clients 103, management computer 101, servers 201 and storage systems 401 could be connected to a single communication network.

A client 103 is a computer that transmits a file access request in respect of a server 201. In this file access request for example a device filename or device number is specified.

The management computer 101 is a computer that manages one or more servers 201. In response to a request from an administrator, the management computer 101 accesses a server 201 and performs for example persistent binding setting, to be described. The storage systems 401 may be managed from the management computer 101.

The servers 201 may be for example file servers that provide file services (e.g. NAS (Network Attached Storage) heads) in respect of the clients 103. There may be for example a plurality of servers 201, and at least one of this plurality of servers 201 may have the function of virtually providing a plurality of shared units (logical open units, all or part of a file system) managed by a plurality of servers 201 as a single namespace (global namespace (GNS)) for a client 103.

A server 201 may comprise a network interface 209, which is a communication interface unit for performing communication through the LAN 102, one or more host bus adapters (for example two host bus adapters: HBA0, HBA1) 215 constituting communication interface units for performing communication through the SAN 104, a local disk 205 such as a hard disk drive constituting a disk storage unit (other types of storage unit, not merely disk storage units, may be employed), memory (which may be another type of storage unit) 207, and a CPU 203. The memory 270 may store for example server software 211 as a computer program executed by the CPU 203. Also, the memory 207 may store a number/filename management table 214, minor number management table 213 and persistent binding setting table 217.

The SAN 104 comprises one or more FC (fibre channel) switches 301. The respective ports 303 of the FC switch 301 are connected with ports 403 of HBA 215, another FC switch 301, or a storage system 401.

A storage system 401 comprises a plurality of physical storage units (for example hard disk drives or flash memory devices) 413, and controllers 406 that control access to the plurality of physical storage units 413.

One or a plurality of RAID groups is constituted by a plurality of physical storage units 413. A RAID group is two or more storage units constituting a RAID (redundant array of independent (or inexpensive) disks). A logical unit (LU) 415 is formed as a logical storage unit based on the storage space provided by a RAID group. A storage system 401 may comprise a plurality of LUs 415.

A controller 406 comprises a storage I/F 411 constituting a communication interface unit that controls communication with a plurality of ports 403 and/or a CPU 405 and/or memory 407 and/or a physical storage unit 413. A memory 407 has for example a cache memory region that temporarily stores the processing results of the CPU and/or a control region that stores for example structural information relating to the structure of the storage system 401. For example an LU management table 409 is stored in the control region as one item of structural information.

Hereinbelow, server software 211, a number/filename management table 214, a minor number management table 213, a persistent binding setting table 217, a port management table 410 and an LU management table 409 are described.

Figure 3:
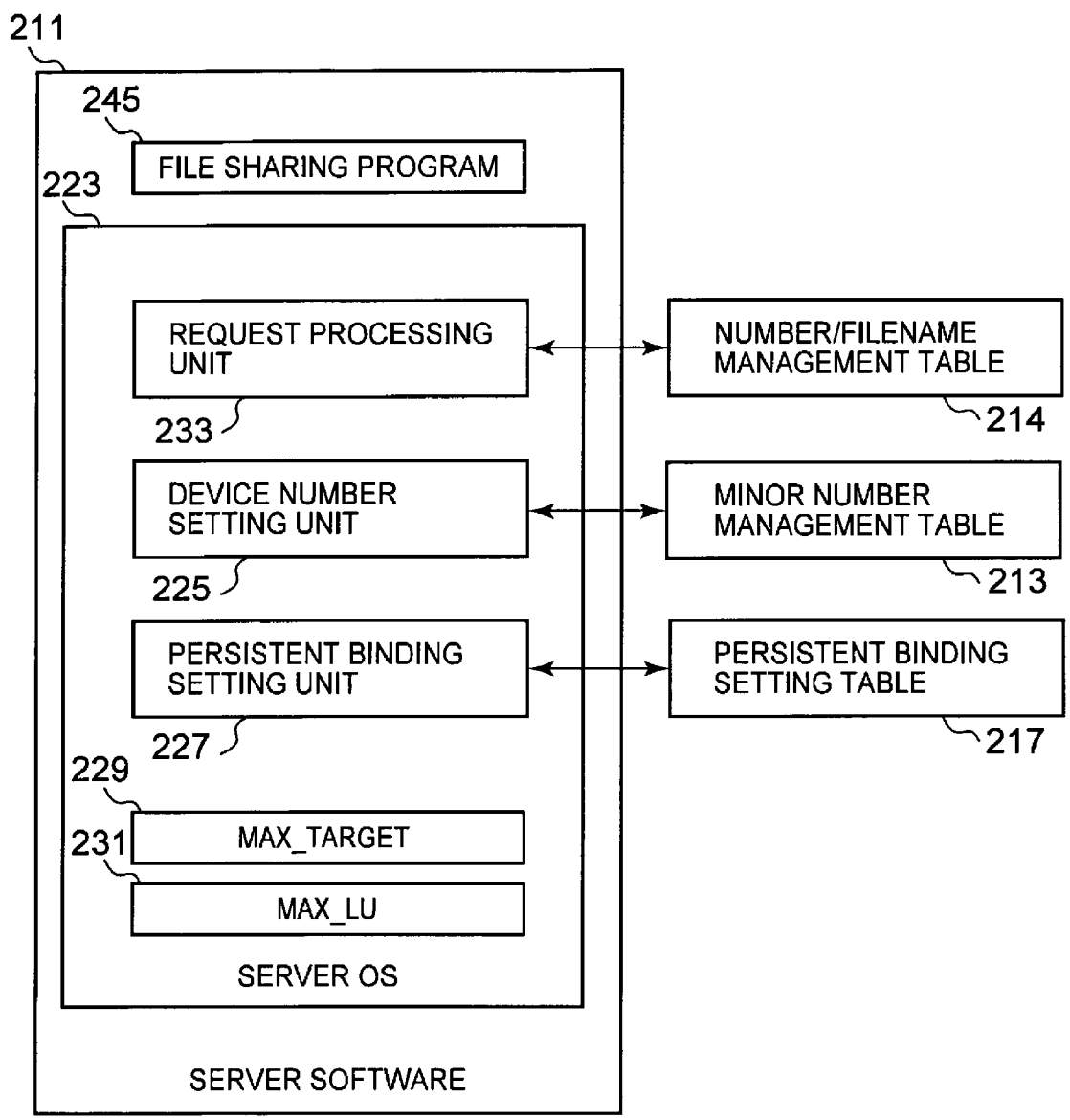
FIG. 3 shows an example of the structure of server software 211.

FIG. 3 shows an example of the construction of server software 211. Hereinbelow, in the case of clauses that have a computer program as subject, it is to be understood that processing is actually performed by a CPU that executes the computer program.

The server software 211 may include for example a file sharing program 245 and a server OS 223 (it is not necessary that the file sharing program 245 and server OS 223 are a single package). The file sharing program 245 may also be included in the OS server 223.

The file sharing program 245 provides a file sharing protocol (such as for example NFS (Network File System) or CIFS (Common Internet File System)) to one or more clients 103, and provides a file sharing function between one or more clients 103. The file sharing program 245, on receipt of a file access request from a client 103, transmits a file access instruction (write/read instruction) in accordance with this file access request in respect of the server OS 223.

The server OS 223 is for example a UNIX-based OS (Operating System). The server OS 223 recognizes a target (for example the port 403 of a storage system 401) and device (for example LU 415 of the storage system 401) by transmission of a query command of a prescribed type (for example an inquiry command or Report LUN command). Also, the server OS 223 for example in response to a file access instruction from the file sharing program 245, creates a block access request for accessing a data block constituting a file designated by this file access instruction, and transmits this block access request from the HBA 215. The server OS 223 comprises for example a request processing unit 233, a device number setting unit 225, a persistent binding setting unit 227, a MAX_TARGET 229, and a MAX_LU 231. MAX_TARGET 229 is information indicating the maximum number of targets that can be recognized. MAX_LU 231 is information indicating the maximum number of LUs that can be recognized in respect of a single target. At least one of MAX_TARGET 229 and MAX_LU 231 may be embedded in the source code of the server OS 223, or may be stored in memory 207 independently of the server OS 223. The request processing unit 233 is a computer program that accepts a request designating a device filename or a device number and that utilizes a number/filename management table 214. The device number setting unit 225 is a computer program corresponding to a SCSI driver and utilizes a minor number management table 213. The persistent binding setting unit 227 is a computer program that performs persistent binding setting in respect of a persistent binding setting table 217.

FIG. 4A shows an example of the layout of a number/filename management table 214.

The number/filename management table 214 is a table for managing the correspondence of the device number in respect of a recognized device and the device filename. A single entry set (a single row) in the number/filename management table 214 corresponds to a single device. A single entry set comprises a device number portion 2141 and device filename 2142. The device number portion 2141 is a portion constituting the device number and in this case is a set of the driver type number and minor number. This set may further include a partition number, to be described. That is, the device number itself may be registered.

FIG. 4B shows an example of the layout of a minor number management table 213.

The minor number management table 213 is a table for managing the correspondence of a recognized device and the minor number that has been decided upon. An entry set (a single row) in the minor number management table 213 corresponds to a single device. A single entry set (row) comprises a minor number 2131, target ID 2132 and LUN 2133.

FIG. 4C shows an example of the layout of a persistent binding setting table 217.

The persistent binding setting table 217 is a table for managing the correspondence of WWN and ID of the target. A single entry set in the persistent binding setting table 217 corresponds to a single target. A single entry set comprises an adapter number 2171, WWN 2172 and target ID 2173. The adapter number 2171 is a number for recognizing an HBA 215. The WWN 2172 is the WWN of the port 403. The target ID 2173 is another type of identifier from the WWN associated with the WWN 2172.

FIG. 5A shows an example of the layout of a port management table 410.

The port management table 410 is a table for managing the ports 403 that are present in the storage system 401. A single entry set in the port management table 410 corresponds to a single port 403. A single entry set comprises the port number 4101 and WWN 4102. The port number 4101 is a number for identifying the port 403. The WWN 4102 is the WWN of the port 403.

FIG. 5B shows an example of the layout of an LU management table 409.

The LU management table 409 is a table for managing the LUs present in the storage system 401. A single entry set in the LU management table 409 corresponds to a single LU. A single entry set comprises the LDEV number 4091, port number 4092 and LUN 4093. The LDEV number 4091 is the identifier of the LU that is used by the storage system 401 for identifying the LU 415. A single LU comprises for example one or more logical sub-memory devices (LDEV); the LDEV number 4091 is the number of the LDEV. The port number 4092 is the number of the port via which access is effected to the server, treating this LDEV as an LU. The LUN 4093 is the number of the LU that is returned in response to a prescribed query command.

The above constitutes the description in respect of the server software 211, minor number management table 213, persistent binding setting table 217, port management table 410 and LU management table 409.

In this first embodiment, starting up of the server 201 takes place after performance of setting of the persistent binding and determination of the minor number and device filename. The respective processing is described in detail below.

<<Persistent Binding Setting>>

For example, when the server OS 223 is first booted after installation, in accordance with instructions from the management computer 101, the persistent binding setting unit 227 of the server OS 223 can accept the persistent binding setting from the management computer 101. The persistent binding setting associates the target ID with the WWN of each port 403. The correspondence relationship of the WWNs and target IDs is fixed in accordance with the persistent binding setting. The WWN of a port 403 can for example be acquired by issuing a prescribed query command through a prescribed or arbitrary HBA 215, as a response to this query command. The persistent binding setting unit 227 displays the acquired WWNs and accepts the target IDs corresponding to these WWNs from the management computer 101. On input of the target IDs associated with the WWNs, the persistent binding setting unit 227 registers in the persistent binding setting table 217 the target ID associated with the WWN and the adapter number corresponding to the HBA that received notification of this WWN, for each WWN. Persistent binding setting is thereby completed. It should be noted that the persistent binding setting unit 227 may automatically determine, in accordance with a prescribed rule, the target IDs associated with the WWNs, and may register the target IDs that are thus determined in the persistent binding setting table 217.

When the persistent binding setting is completed, the server OS 223 may execute specified processing (for example rebooting or re-reading of the settings), and, during this specified processing, may execute processing (processing shown in FIG. 8) for determining the minor number and device filename.

<<Determination of the Minor Number and Device Filename>>

Figures 6A, 6B:
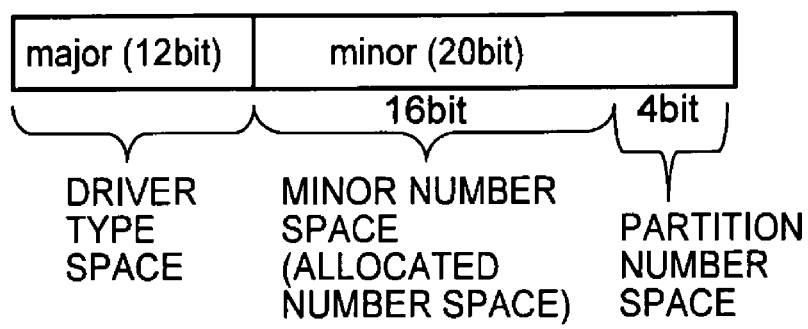
FIG. 6A shows an example of device number format.
FIG. 6B shows a minor number calculation formula.

The format of the device number that is managed by the server OS 223 is a format as shown by way of example in FIG. 6A. Specifically, the device number is represented in 32 bits space, this space comprising a major space, which is a space on the upper side, and a minor space, which is a space on the lower side. The major space comprises for example 12 bits and the minor space comprises for example 20 bits. In the major space there is represented prescribed significant information such as for example the driver type number. The upper side of the minor space (for example 16 bits) represents the minor number and the lower side (for example four bits) represents the partition number. Since the minor number comprises 16 bits, $2^{16}=65536$ minor numbers can be allocated; since the partition number is four bits, $2^4=16$ partitions (for example partitions of the LU 415 recognized by the server OS 223) can be created. It should be noted that although, in general, the bits including the partition number (four bits) are referred to as the "minor number", in the description of the first embodiment and the second embodiment, to be described, for convenience, the upper 16 bits will be referred to as the "minor number".

In the first embodiment, the minor number is calculated by the minor number calculation formula (formula (I) given below) shown by way of example in FIG. 6B.

The minor number (i.e. the allocated number)=target ID×MAX_LU+LUN    (1)

where, in this minor number calculation formula, there are three variables, namely, the target ID, MAX_LU and LUN. The MAX_LU 231 that is managed by the server OS 223 is substituted in the variable MAX_LU.

In this minor number calculation formula, the minor number is determined in accordance with which LU 415 is associated with which port 403. In a single server 201, the persistent binding setting unit 217 forbids association of identical target IDs to different WWNs and consequently identical target IDs cannot be registered in the persistent binding setting table 217. Consequently, in a single server 201, the combination of target ID and LUN cannot overlap with another combination of target and LUN, i.e. it represents a unique combination. Thus, a minor number corresponding to a unique combination of target ID and LUN is calculated by the above calculation formula (I).

Also, in this minor number calculation formula, the target ID is adopted as a variable rather than the WWN.

The significance of the minor number calculation formula will now be described with reference to FIG. 7A to FIG. 7C.

If the size of the minor number space is assumed to be n bits (when n is a natural number), the size of the range of minor numbers (hereinbelow referred to as the minor number range) may be expressed by $2^n$ (2 to the nth power). Since in this embodiment the size of the minor number space is 16 bits, the minor number range size, as described above, is $2^{16}=65536$. Minor number allocation is performed in the range represented by this size. Specifically, in the above minor number calculation formula, the minor number range is divided into each of the sizes indicated by MAX_LU 231; the sub-range between one division and another division is allocated to a single target ID; in this sub-range, a minor number is allocated for each LU belonging to the corresponding target ID in this sub-range.

Due to the adoption of the above arrangement, depending on the value indicated by MAX_LU 231 and the value indicated by MAX_TARGET 229, the size of the minor number range may be just right, or too large, or insufficient.

Figure 7A:
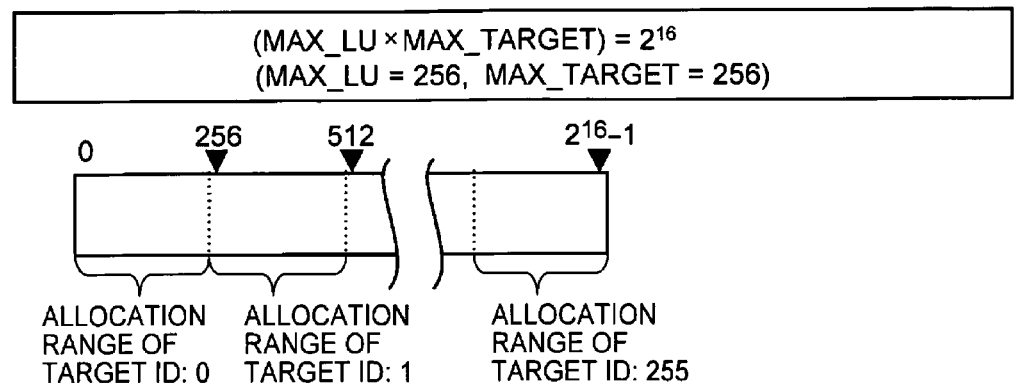
FIG. 7A shows an example of the handling of the minor number range in the case where the product of MAX_TARGET and MAX_LU is the same as the minor number range size.

The case where the minor number range size is just right, as shown in FIG. 7A, is a case where the product of MAX_LU 231 and MAX_TARGET 229 coincides with the minor number range size. FIG. 7A shows the case where MAX_LU 231=256 and MAX_TARGET 229=256. In this case, the minor number range is divided into 256 sub-ranges of size 256 in each case; a single sub-range is allocated to a single target ID. That is, to a single target ID, there will be allocated 256 unique minor numbers (i.e. unique minor numbers of the amount of the maximum number of LUs in respect of a single port).

Figure 7B:
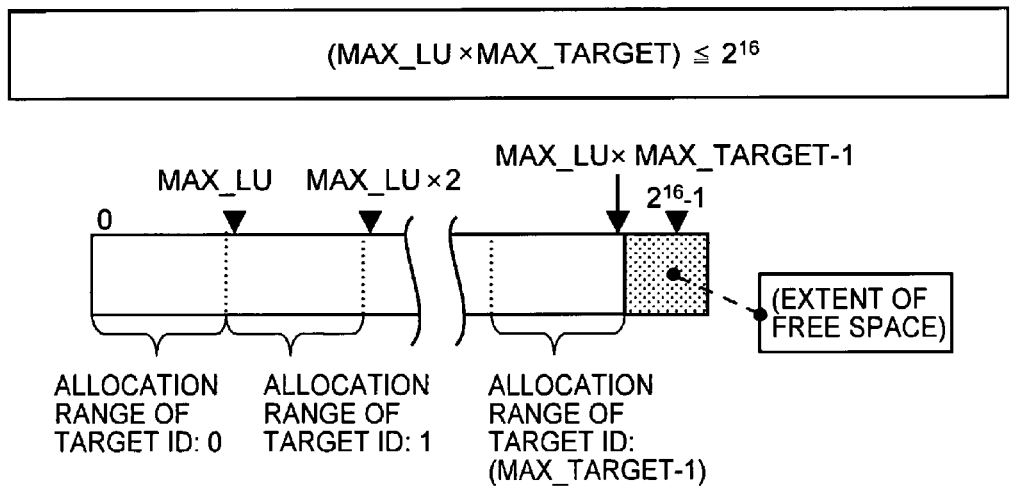
FIG. 7B shows an example of the handling of the minor number range in the case where the product of MAX_TARGET and MAX_LU is less than the minor number range size.

The case where the minor number range size is too large, as shown in FIG. 7B, is a case where the product of MAX_LU 231 and MAX_TARGET 229 is less than the minor number range size. In this case, in the minor number range, the range from the product of MAX_LU 231 and MAX_TARGET 229, to $2^{16}$, is excessive.

Figure 7C:
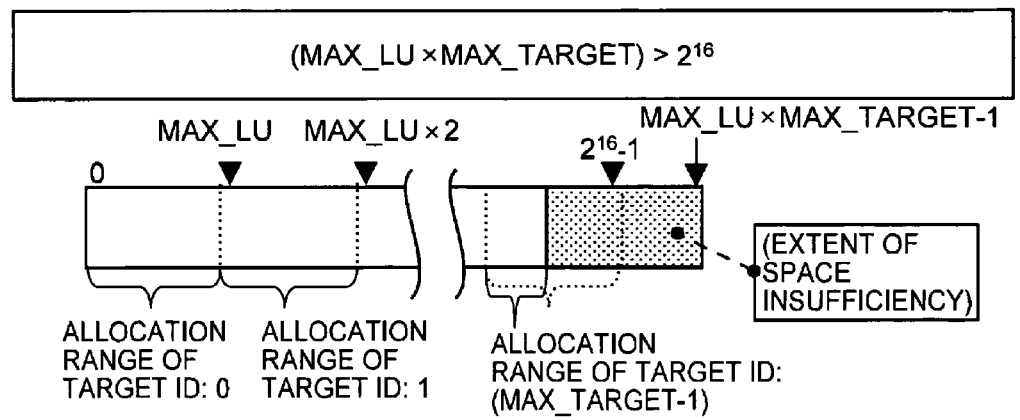
FIG. 7C shows an example of the handling of the minor number range in the case where the product of MAX_TARGET and MAX_LU exceeds the minor number range size.

The case where the minor number range size is insufficient, as shown in FIG. 7C, is a case where the product of MAX_LU 231 and MAX_TARGET 229 exceeds the minor number range size. In this case, in the minor number range, the range from the product of MAX_LU 231 and MAX_TARGET 229, to $2^{16}$, is insufficient. Also, FIG. 7C shows that it is also possible for this not to be entirely allocated to the amount of MAX_LU 231 in respect of a single target ID (for example the target ID=value indicated by MAX_TARGET 229 minus 1).

Hereinbelow, the processing for determining the minor number and device filename that is performed by the server OS 223 will be described with reference to FIG. 8. It should be noted that, in FIG. 8, "Step" is abbreviated as "S".

This processing is performed during the specified processing of the server OS 223 after completion of persistent binding setting (for example during rebooting or during re-reading of settings).

The device number setting unit 225 acquires MAX_LU 231 and sets (S 101) this in a working region of the memory 207. Also, the device number setting unit 225 sets (S 102) the minor number calculation formula in for example a register in the CPU 203.

Next, the device number setting unit 225 executes (S 103) an adapter scan constituting processing for searching for recognizable HBAs. As a result, if a recognizable HBA (non-selected HBA) is found (S 104: YES), processing advances to S 105; if no such recognizable HBA is found (S 104: NO), processing is terminated.

In S 105, the device number setting unit 225 executes target scanning, which is processing for searching for a recognizable target. For example, the device number setting unit 225 transmits a prescribed query command from a recognized HBA by S 103 and receives and analyses the response in respect of this query command. If, as a result of this target scan, it is found that there is no recognizable target (S 106: NO), processing returns to S 103; if a recognizable target is found (for example the WWN of port 403 is received) (S 106: YES), processing advances to S 108.

In S 108, the device number setting unit 225 interrogates the persistent binding setting unit 227 regarding the target ID corresponding to the WWN of the recognized target (port 403). The persistent binding setting unit 227 searches for the target ID corresponding to this WWN from the persistent binding setting table 217 and, if it is successful in finding this target ID, returns the target ID that has thus been found to the device number setting unit 225; but if it is unsuccessful in finding this target ID, it returns a message representing that result (no target ID has been found) to the device number setting unit 225. If the device number setting unit 225 receives the message (S 108: NO), processing returns to S 105; but if a target ID is received (S 108: YES), the device number setting unit 225 sets (S 109) this target ID in the working region of the memory 207, and processing advances to S 110.

In S 110, the device number setting unit 225 executes an LU scan, which is processing for searching for LUs associated with the WWN that has been acquired by the target scan. Specifically, for example, the device number setting unit 225 issues a prescribed query command (for example Report LUN) to the storage system 401 where the port 403 corresponding to this WWN is provided, receives the response corresponding to this command from the storage system 401, and analyses this response. If, as a result of this LU scan, the device number setting unit 225 fails to find a recognizable LU (S 111: NO), processing returns to S 105; but if a recognizable LU is found (for example if a single LUN is received) (S 111: YES), processing advances to S 112.

In S 112, the device number setting unit 225 makes a decision as to whether or not the already allocated number of minor numbers is less than $2^{16}$. The "already allocated number" that is here referred to is not the number of actually allocated minor numbers, but rather can be regarded as a value indicating up to what position in the minor number range (see FIG. 7A to FIG. 7C) referred to above is currently being used. The reason for this is that, in regard to a given sub-range in the minor number range, if the number of LUs (number of recognized LUs) associated with a target corresponding to this sub-range is the same number as the number indicated by MAX_LU 231 acquired in S 101, all of the sub-range is used, but, if the number of recognized LUs is less than the number indicated by MAX_LU 231, unused portions of the sub-range are generated.

If the result of the decision of S 112 is positive (S 112: YES), processing advances to S 113; if the result of the decision of S 112 is negative (S 112: NO), processing is terminated. If processing is terminated because S 112 is negative, for example the result shown in FIG. 7A or FIG. 7C is obtained. In contrast, if processing is terminated due to some other reason, for example a result as shown in FIG. 7B is obtained. That is, in this first embodiment, whether processing advances to S 113 or terminates is determined in accordance with whether or not the already allocated number is less than the minor number range, irrespective of the value of MAX_TARGET 229.

In S 113, the device number setting unit 225 executes calculation of the minor number calculation formula that was set in S 102, using MAX_LU 231 acquired in S 101, a single target ID that was set in S 109, and a single LUN that was acquired by the LU scan of S 110. In this way, a minor number is calculated that is unique to the combination of this single target ID and this single LUN.

In S 114, the device number setting unit 225 creates a device filename including the calculated minor number and a device file having this device filename, and stores this device file. The storage destination of this device file is for example a file system. If the file system is for example present on the LU 415 of the storage system 401, the device file is stored in this LU 415; if it is present on a local disk 205, the device file is stored in this local disk 205.

In S 115, the device number setting unit 225 registers the calculated minor number 2131, the target ID 2132 and LUN 2133 used in the calculation of this minor number 2131 in the minor number management table 213. Also, the device number setting unit 225 generates a device number including this minor number and a driver type number representing the device number setting unit 225, and registers the device number portion 2141, that is the set of this minor number and driver type number, and the device filename 2142 generated in S 114, in the number/filename management table 214.

After this S 115, processing returns to S 110.

After this series of processes has been terminated, specified processing of the server OS 223 (such as for example rebooting or re-reading of the settings) is completed, and the server OS 223 assumes an operating condition.

Figure 1B:
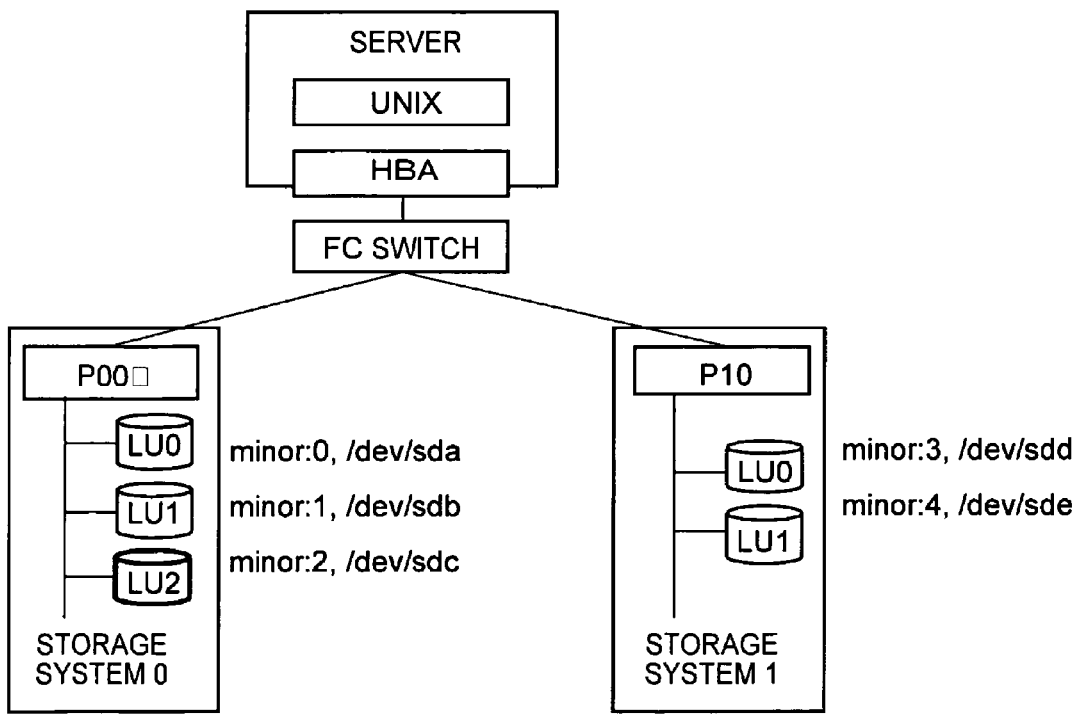
FIG. 1B shows an example of correspondence of LU with minor number and device filename when an LU is added in FIG. 1A.
Figure 9A:
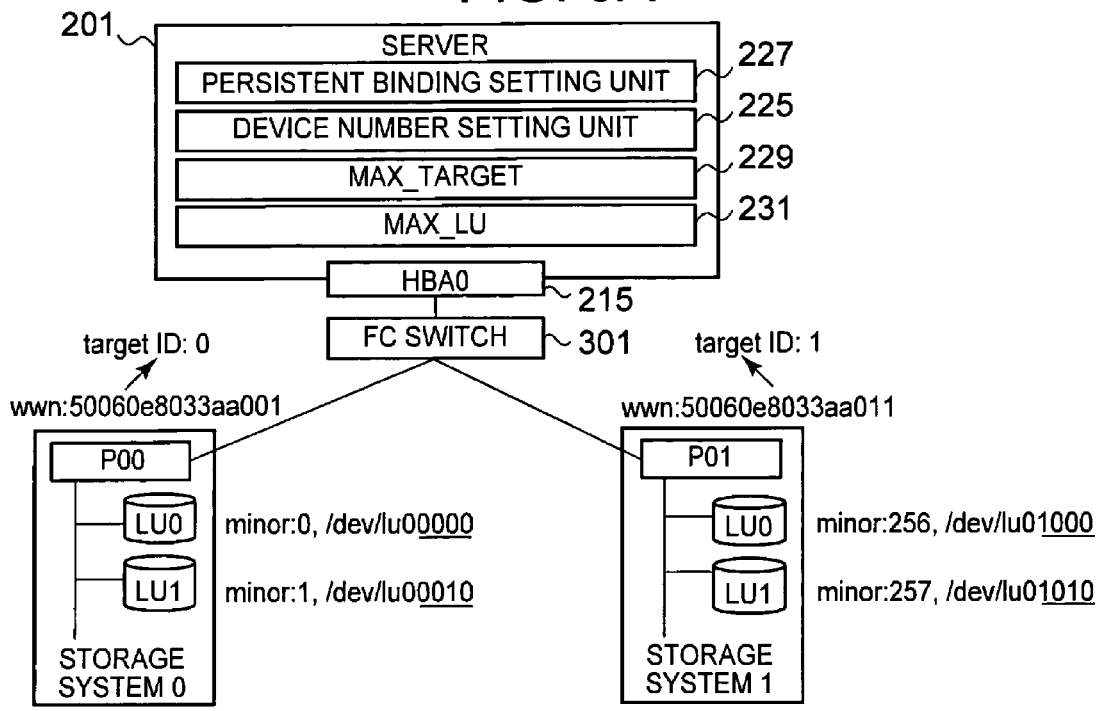
FIG. 9A shows an example of the correspondence of LU with minor number and device filename prior to the addition of an LU2 on a port (P00) of a storage system 0 according to the first embodiment of the present invention.
Figure 9B:
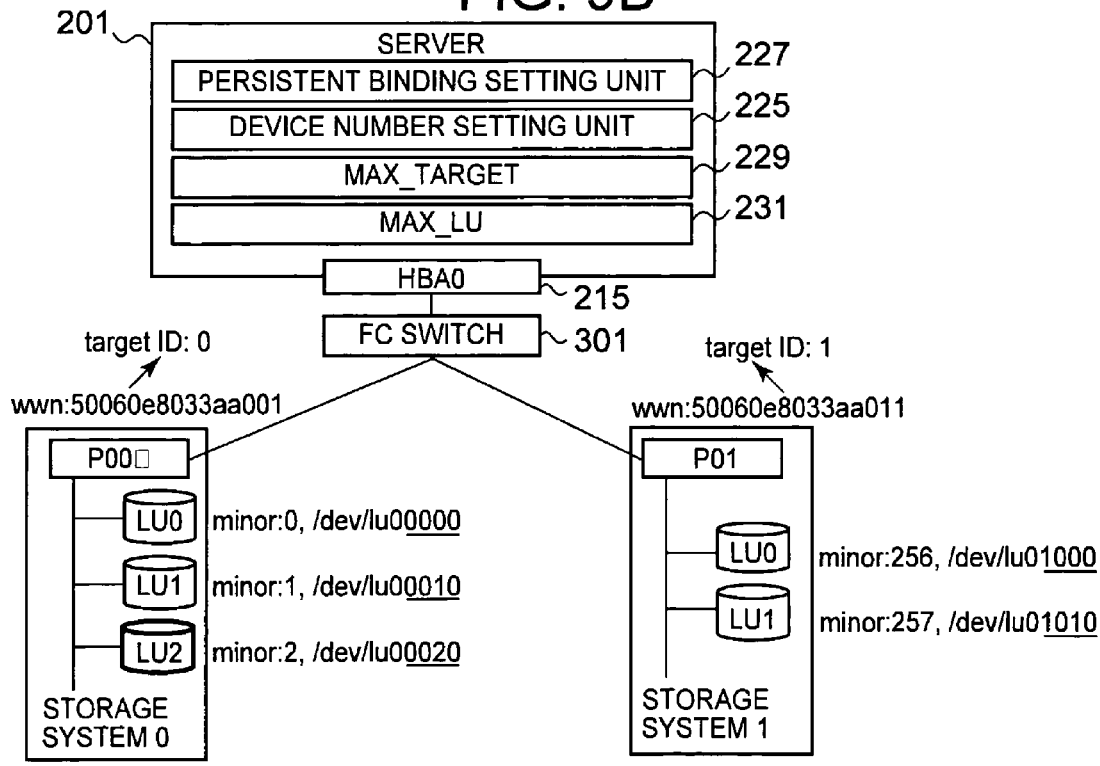
FIG. 9B shows an example of the correspondence of LU with minor number and device filename after addition of an LU2 on P00.

FIG. 9A and FIG. 9B show the results of processing for determining the minor number and device filename described above. FIG. 9A shows an example of the correspondence of LU with minor number and device filename prior to addition (in other words, after malfunction at LU 2) of an LU (LU 2) corresponding to LUN 2 to a port 403 (P00) of the storage system 0. FIG. 9B shows an example of the correspondence of LU with minor number and device filename after addition of LU 2 to P00 (in other words, prior to the malfunction of LU 2). According to FIG. 9A and FIG. 9B, in contrast to FIG. 1A and FIG. 1B, it can be seen that the correspondence of the LU and minor number before addition and after addition of the LU 2 (in other words, after occurrence of malfunction and prior to occurrence of malfunction in LU 2) has become fixed (i.e. is unaltered). The reason why the minor number is unaltered is that the minor number is calculated by using formula (1) described above.

Also, in this embodiment, as described above, a device filename including a numerical value indicating the calculated minor number is created in respect of the device corresponding to this minor number. The underlined location in the device filename illustrated in the Figure is a numerical value corresponding to the minor number. A numerical value that expresses the minor number by a prescribed rule (for example hexadecimal number) is included in the device filename. In this way, not merely the minor number but also the correspondence relationship between the device filename and device can be fixed. Also, due to this fixing, a correspondence table and/or processing to follow up the record on the correspondence table are unnecessary, so the storage capacity consumed and/or the load on the server 201 can be suppressed. Also, it becomes possible to specify uniquely the minor number from this device filename by analyzing the device filename.

At least one of the device filename generated as above and the device number is reported to the host side of the server OS 223 (for example to the client 103). In this way, after the server 201 has been started up, a request specifying the device filename or device number can be received by the server OS 223.

<<Starting Up of the Server 201>>

When the server 201 is in operating condition, the request processing unit 233 of the server OS 223 accepts from a client 103 a request specifying a device filename or device number.

If the request received by the request processing unit 233 is a request specifying a device filename, the request processing unit 233 acquires from the number/filename management table 214 the device number portion 2141 corresponding to the device filename 2142 that coincides with this device filename. The request processing unit 233 specifies the driver that is the target of provision of the minor number in this device number portion 2141 from the driver type in the acquired device number portion 2141 and provides this minor number to the specified driver. In this case, it will be assumed that this driver is a device number setting unit 225 constituted by a SCSI driver. The device number setting unit 225 acquires from the device number management table 213 a target ID 2132 and LUN 2133 corresponding to the minor number 2131 coinciding with the minor number provided from the request processing unit 233. The WWN 2172 corresponding to the target ID 2173 coinciding with this target ID 2132 is acquired from the persistent binding setting table 217 by the persistent binding setting unit 227. In this way, a request including an acquired WWN 2172 and acquired LUN 2133 is transmitted from the server OS 223 from the HBA 215 corresponding to the adapter number 2171 corresponding to this WWN 2172.

If the request received from the request processing unit 233 is a request specifying a device number, the request processing unit 233 specifies from the driver type number in the device number the driver that is the target of provision of the minor number in this device number and provides this minor number to the specified driver. In this case, it will be assumed that this driver is a device number setting unit 225 constituted by a SCSI driver. Subsequent processing is the same as in the case where the request received from the request processing unit 233 is a request specifying a device filename.

The above is a description of the first embodiment. It should be noted that, in the first embodiment, the device filename, in addition to the minor number, may include a driver type number. In this way, the number/filename management table 214 may be rendered unnecessary. The reason for this is that it becomes possible to specify the driver type number or minor number from a character sequence (code group) at a prescribed position in the device filename.

With the first embodiment described above, the correspondence of the WWN and target ID is fixed by the persistent binding setting, and a minor number is calculated that is unique to the combination of this target ID and LUN by a calculation formula using this target ID, MAX_LU, and scanned LUN. In this way, the correspondence of the device and minor number can be made fixed (invariant). Also, since this unique minor number is calculated by a calculation formula as above, the storage capacity consumed and the load on the server 201 can be reduced.

Second Embodiment

The second embodiment of the present invention is described below. The description will concentrate on differences from the first embodiment and description of features that are common with the first embodiment will be omitted or abbreviated.

Figure 10:
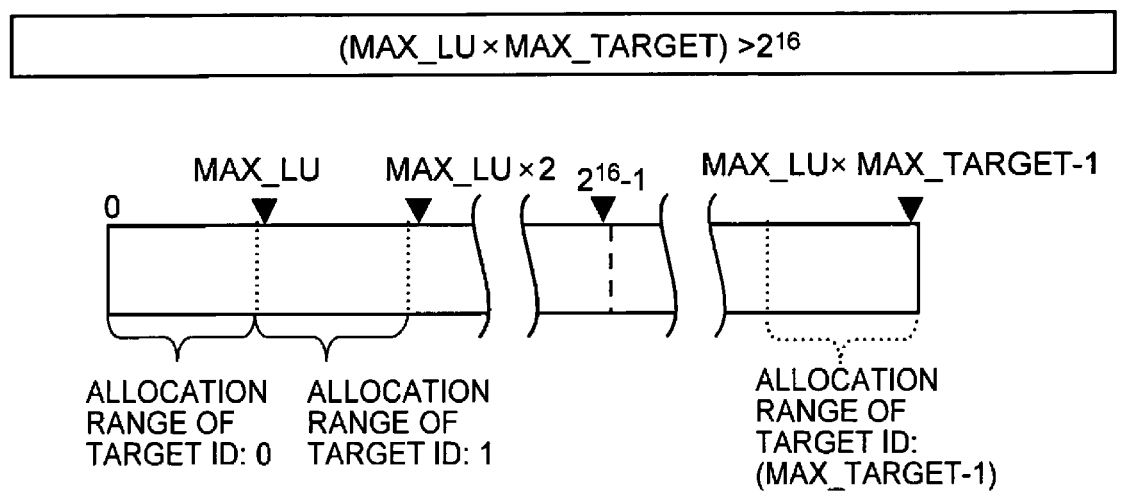
FIG. 10 shows an example of the handling of the minor number range in the case where the product of MAX_TARGET and MAX_LU exceeds the minor number range size according to the second embodiment of the present invention.

In the second embodiment, besides the processing as in FIG. 7C, the case where the product of MAX_LU 231 and MAX_TARGET 229 exceeds the size of the minor number range can be coped with by device number format alteration processing as in FIG. 10. For example, the size of the minor number range can be expanded from $2^n$ to $2^{n+m}$ by shifting m usable bits (where m is a natural number) of the major space to the minor number space (i.e. by making the size of the minor number space (n+m) bits).

The "m usable bits" are for example bits of the major space constituting a portion other than a portion that is used for the expression of significant information (in the above example, the driver type number). The m usable bits are for example consecutive bits all of the same numerical value (for example 1 or 0). The m usable bits are at a specific position in the major space (for example a range of m consecutive bits from the head or a range of m consecutive bits from the tail end).

Hereinbelow, FIG. 11 shows an example of the flow of processing for determining the minor number and device filename according to the second embodiment of the present invention.

The device number setting unit 225 acquires MAX_LU 231 and sets this (S 201) in a working region of the memory 207. Also, the device number setting unit 225 acquires MAX_TARGET 229, sets this in a working region of the memory 207, and sets (S 202) the minor number calculation formula in for example a register in the CPU 203.

Next, the device number setting unit 225 makes a decision (S 203) as to whether or not overflow of the minor number space is generated. Specifically, for example the device number setting unit 225 makes a decision as to whether or not the product of MAX_TARGET 229 and MAX_LU 231 exceeds the minor number range size ($2^{16}$). If the result of this decision is negative (S 203: NO), the processing of S 103 and subsequent steps in FIG. 8 is performed. If the result of this decision is positive (S 203: YES), processing advances to S 204.

In S 204, the device number setting unit 225 makes a decision as to whether or not it is possible to add on the minor number. Specifically, for example the device number setting unit 225 decides whether or not there are m usable bits in the major space and it is possible to make the size of the minor number range equal to or more than the product of MAX_TARGET 229 and MAX_LU 231 by shifting these m bits to the minor number space. If the result of this decision is negative (S 204: NO), the processing of S 103 and subsequent steps in FIG. 8 is performed. If the result of this decision is positive (S 204: YES), processing advances to S 205.

In S 205, the device number setting unit 225 performs device number format alteration. Specifically, for example the device number setting unit 225 shifts the m usable bits of the major space to the minor number space.

After this, S 206, S 207, S 208, S 209, S 211, S 212, S 213, S 214, S 215, S 216 and S 217 respectively corresponding to S 103, S 104, S 105, S106, S 108, S 109, S 110, S 111, S 113, S 114 and S 115 in FIG. 8 are performed.

With the second embodiment, if there are m usable bits in the major space, even if the product of MAX_LU 231 and MAX_TARGET 229 exceeds the default minor number range size, this minor number range size can be expanded to at least the product of MAX_LU 231 and MAX_TARGET 229 by altering the format of the device number in accordance with the value of m. Unique minor numbers can thereby be allocated to respective devices of the same number as the product of MAX_LU 231 and MAX_TARGET 229 and managed.

While several suitable embodiments of the present invention have been described above, these are given merely in order to describe the present invention and there is no intention to restrict the scope of the present invention solely to these embodiments. The present invention can be put into practice in various other modes. For example, regarding at least one of the LUN and target ID, it is not necessarily essential that these should be consecutive numbers from 0. Also, for example the server need not be a file server but could be another type of host device for the storage system 401 such as for example a host computer. An application program may be provided in the host computer and the host computer OS may receive requests specifying a device filename or device number from this application program.

What is claimed is:

1. A file server coupled to a plurality of storage systems each including a plurality of Logical units (LUs) and a plurality of ports, comprising:

a processor controlling a file access request from a client computer to one of the plurality of LUs stored in at least one of the plurality of storage systems; and a memory storing correspondence information between a plurality of target IDs associated to the WWN (World Wide Name) of each of the ports of the plurality of storage systems;

wherein the processor acquires a maximum LU number, which is a value prepared beforehand and expressing a maximum number of LUs stored in the plurality of storage systems, in respect of a single port of the storage systems, wherein the processor acquires a first target ID from the plurality of target IDs in order to allocate the first target ID to a certain LUN (logical unit number) which is not allocated to any of the plurality of target IDs, wherein the processor determines that a first LUN is not allocated to any of the plurality of target IDs and assigns an unique device ID showing an order of the LUs of the plurality of storage systems, to the first LUN by calculating a formula that multiplies the first target ID and the maximum LU number and adds the first LUN, wherein the processor creates a device file having a device filename including the unique device ID corresponding to the first LUN, wherein a format of device information corresponding to the LU, managed by a UNIX-based OS, is divided to a major space including a type of the device and a minor space representing a space other than the major space in the format, and wherein the unique device ID is a specified number registered in the minor space.

2. The file server according to claim 1, wherein the processor acquires a maximum target number, which is a value prepared beforehand and expressing a maximum number of the ports of the plurality of storage systems, wherein the processor acquires a maximum device number, which is a value prepared beforehand and expressing a maximum number of devices corresponding one of the ports of the plurality of storage systems, wherein the processor makes a decision as to whether or not a number of the unique device ID is smaller than a multiplied product of said acquired maximum target number and said acquired maximum device number, and wherein if a result of said decision is negative, the processor terminates without calculating the unique device ID.

3. The file server according to claim 2
wherein if the result of said decision is negative, the processor increases a size of the minor space for representing the unique device ID, by allocating available bit from the major space to the minor space.

4. The file server according to claim 3,
wherein the processor makes a decision as to whether or not there is available bit in the major space, before allocating available bit from the major space to the minor space.

5. The file server according to claim 2, wherein the device is one of the LUs stored in the plurality of storage systems.

6. The file server according to claim 1, wherein the processor assigns the unique device ID to the first LUN during rebooting or re-lording a configuration of the OS after persistent binding setting process.

7. The file server according to claim 1 wherein the OS comprises a SCSI driver and the processor controls the SCSI driver.

8. The file server according to claim 1, wherein the processor
performs a first decision as to whether or not k (where k is a natural number) bits shiftable to a specified number space, which is a space for expressing said specified number are present in said major space, if the product of the maximum target number, which is a value prepared beforehand and expressing the maximum number of targets, and said maximum LU number is larger than $2^n$ (where n is the bit number constituting the size of the space expressing said specified number, and is a natural number), which is the maximum number of said specified number; and wherein if a result of said first decision is positive, the processor expands a size of said specified number space from n bits to n+k bits without altering the space size of the device number, by shifting said k shiftable bits in said major space to said specified number space.

9. The file server according to claim 8, wherein
if the result of said first decision is negative, the processor performs a second decision as to whether or not the number of said calculated specified number is smaller than the product of said acquired maximum target number and said acquired maximum LU number; wherein
when said specified number in respect of one LU constituting a single device has been calculated, said device related value acquisition unit acquires a LUN in respect of another single LU; and if the result of said second decision is negative, said device identification value calculation unit terminates without calculating said specified number in respect of said acquired single LUN.

10. A computer system comprising:
a plurality of storage systems each including a plurality of Logical units (LUs) and a plurality of ports; and
a file server comprising a processor controlling a file access request from a client computer to one of the plurality of LUs stored in at least one of the plurality of storage systems and a memory storing correspondence information between a plurality of target IDs associated to the WWN (World Wide Name) of each of the ports of the plurality of storage systems;

wherein the processor acquires a maximum LU number, which is a value prepared beforehand and expressing a maximum number of LUs stored in the plurality of storage systems, in respect of a single port of the storage systems, wherein the processor acquires a first target ID from the plurality of target IDs in order to allocate the first target ID to a certain LUN (logical unit number) which is not allocated to any of the plurality of target IDs, wherein the processor determines that a first LUN is not allocated to any of the plurality of target IDs and assigns an unique device ID showing an order of the LUs of the plurality of storage systems, to the first LUN by calculating a formula that multiplies the first target ID and the maximum LU number and adds the first LUN, wherein the processor creates a device file having a device filename including the unique device ID corresponding to the first LUN, wherein a format of device information corresponding to the LU, managed by a UNIX-based OS, is divided to a major space including a type of the device and a minor space representing a space other than the major space in the format, and wherein the unique device ID is a specified number registered in the minor space.

11. A method of computer system comprising a plurality of storage systems each including a plurality of Logical units (LUs) and a plurality of ports and a file server, comprising the steps of:

controlling a file access request from a client computer to one of the plurality of LUs stored in at least one of the plurality of storage systems;

storing correspondence information between a plurality of target IDs associated to the WWN (World Wide Name) of each of the ports of the plurality of storage systems;

acquiring a maximum LU number, which is a value prepared beforehand and expressing a maximum number of LUs stored in the plurality of storage systems, in respect of a single port of the storage systems;

acquiring a first target ID from the plurality of target IDs in order to allocate the first target ID to a certain LUN (logical unit number) which is not allocated to any of the plurality of target IDs;

determining that a first LUN is not allocated to any of the plurality of target IDs and assigns an unique device ID showing an order of the LUs of the plurality of storage systems, to the first LUN by calculating a formula that multiplies the first target ID and the maximum LU number and adds the first LUN and creating a device file having a device filename including the unique device ID corresponding to the first LUN;

wherein a format of device information corresponding to the LU, managed by a UNIX-based OS, is divided to a major space including a type of the device and a minor space representing a space other than the major space in the format, and wherein the unique device ID is a specified number registered in the minor space.

* * * * *